United States Patent
Larsson et al.

(10) Patent No.: US 7,283,783 B2
(45) Date of Patent: Oct. 16, 2007

(54) METHOD AND SYSTEM FOR BROADCASTING VIA PHASE-SHIFT KEYING MODULATION WITH MULTIPLE TRANSMIT ANTENNAS

(75) Inventors: Erik G. Larsson, Gaithersburg, MD (US); Wing Hin Wong, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 685 days.

(21) Appl. No.: 10/723,783

(22) Filed: Nov. 26, 2003

(65) Prior Publication Data

US 2004/0161050 A1     Aug. 19, 2004

Related U.S. Application Data

(60) Provisional application No. 60/429,229, filed on Nov. 26, 2002.

(51) Int. Cl.
     *H04H 1/00*      (2006.01)
(52) U.S. Cl. .................. 455/3.01; 455/13.3; 455/562.1; 455/24

(58) Field of Classification Search .............. 455/12.1, 455/13.2, 13.3, 15, 3.01, 414.4, 417, 24, 455/66.1, 562.1, 126, 3.06, 19, 500, 502, 455/507, 509, 561, 418; 370/389, 465, 395; 375/259, 267

See application file for complete search history.

(56) References Cited

U.S. PATENT DOCUMENTS

| | | | | |
|---|---|---|---|---|
| 4,531,020 A | * | 7/1985 | Wechselberger et al. | 380/239 |
| 5,909,439 A | * | 6/1999 | Kuwabara et al. | 370/389 |
| 6,898,248 B1 | * | 5/2005 | Elgamal et al. | 375/259 |
| 2003/0172114 A1 | * | 9/2003 | Leung | 709/205 |

* cited by examiner

*Primary Examiner*—Edward F. Urban
*Assistant Examiner*—John J. Lee
(74) *Attorney, Agent, or Firm*—Akerman Senterfitt

(57) ABSTRACT

A method of broadcasting multi-layered information in a multi-antenna broadcasting system can include identifying at least a first and second layer of information to be transmitted. The first layer of information can be encoded for transmission using a first unitary code matrix and the second layer of information can be encoded for transmission using a second unitary code matrix. The first and second layers of the multi-layered information can be transmitted with the multi-antenna broadcasting system.

24 Claims, 2 Drawing Sheets

METHOD AND SYSTEM FOR BROADCASTING VIA PHASE-SHIFT KEYING MODULATION WITH MULTIPLE TRANSMIT ANTENNAS

CROSS-REFERENCE TO RELATED APPLICATIONS

This application claims the benefit of U.S. Provisional Application No. 60/429,229, filed in the United States Patent and Trademark Office on Nov. 26, 2002, the entirety of which is incorporated herein by reference.

BACKGROUND

1. Field of the Invention

The invention relates to the field of communications and, more particularly, to transmitting multi-layered source coded information using multiple transmit antennas.

2. Description of the Related Art

During the last decade, wireless systems with multiple transmit and receive antennas have been studied extensively, and the performance of such systems has been proven to be extremely promising. The propagation channel associated with a system with multiple transmit and receive antennas is sometimes called a multiple-input multiple-output (MIMO) channel, and the associated coding and signal processing is referred to as space-time coding. Using proper space-time coding, it is possible to use the degrees of freedom of the MIMO channel both to increase the throughput and to counteract fading. For this reason, MIMO technology is believed to become a major cornerstone in many future wireless communication systems.

Loosely speaking, communication links can be classified into two categories: point-to-point links and point-to-multipoint links. In the former case, there is exactly one transmitter and one receiver which communicate with each other at a given time, whereas for a point-to-multipoint link, a transmitted message is aimed at multiple different recipients simultaneously. A cellular communication system with mobile users is an example of a point-to-point communication system, whereas a radio/TV broadcast is an example of a point-to-multipoint link, also referred to as broadcast channels.

Point-to-multipoint links are becoming increasingly important. For instance, the introduction of Digital Audio Broadcast (DAB) and High-Definition Television (HDTV) has pioneered a whole new field of digital broadcasting applications. As a further example, it is widely believed that much of the next generation's wireless networking will be based on so-called ad-hoc networks, where it may be necessary for multiple units to listen to one message at the same time. Also, in conventional cell communication systems using directional or adaptive antennas, it is sometimes necessary to broadcast a message to the entire cell.

There are two major differences between point-to-point and point-to-multipoint communication links. First, a point-to-point connection can be optimized for a given transmitter-receiver pair. For instance, a cellular system usually employs power control techniques that adjust the transmitted power to minimize the power consumption, reduce the amount of co-channel interference, and at the same time ensure that the received signal strength exceeds a certain threshold. Second, in contrast to a point-to-point communication link, for a broadcast transmission all receivers have different capabilities to decode the transmitted message. This is so because the different receivers experience in general very different radio link qualities (for instance, due to varying propagation conditions). Moreover, since quality can usually be traded for cost, the receivers themselves may have different inherent abilities to decode the transmitted message.

The fact that distinct receivers have different capabilities for decoding a message suggests that the transmitted signal should consist of several components which are of different importance for the reconstruction of the message (and therefore have an inherently different vulnerability to transmission errors). This idea has lead to the concept of layered source coding which is now a mature technique employed in many multimedia standards. For instance, the image coding standard JPEG-2000 and the video coding standard MPEG-4 use what is sometimes referred to as "fine granularity scalability," which enables a gradual tradeoff between the error-free data throughput and the quality of the reconstructed image or video sequence.

While such progressive source coding methods have been used in Internet applications where data rate can be traded for quality, these techniques have yet to be applied to wireless communications, particularly with respect to streaming video and audio.

SUMMARY OF THE INVENTION

The present invention provides a method, system, and apparatus for a layered space-time coding scheme that does not require any channel knowledge at the transmitter, and which is constructed so as to minimize the error rate. The present invention can encode signals differentially and is based upon phase-shift keying (PSK) modulation. Accordingly, in one embodiment, the transmitted signal has substantially constant envelope.

One aspect of the present invention can include a method of broadcasting multi-layered information in a multi-antenna broadcasting system. The method can include identifying at least a first and second layer of information to be transmitted, encoding the first layer of information for transmission, and encoding the second layer of information for transmission. The method further can include transmitting the first and second layers of the multi-layered information with the multi-antenna broadcasting system.

In one embodiment, the first layer of information can be encoded using a first unitary code matrix and the second layer of information can be encoded using a second and different unitary code matrix. The step of encoding the first layer of information can include differentially encoding a product of the first layer of information and the first unitary code matrix. For example, $U_b$ can represent the unitary code matrix and can be selected from the set $$X_b = \left\{ \begin{bmatrix} 1 & 0 \\ 0 & 1 \end{bmatrix}, \begin{bmatrix} 0 & -1 \\ 1 & 0 \end{bmatrix}, \begin{bmatrix} 0 & 1 \\ -1 & 0 \end{bmatrix}, \begin{bmatrix} -1 & 0 \\ 0 & -1 \end{bmatrix} \right\}$$

such that the product of the first layer of information and the first unitary code matrix is defined by $U_b \in X_b$.

In another embodiment, the step of encoding the second layer of information can include differentially encoding a product of the second layer of information and the second unitary code matrix. For example, $U_a$ can represent the unitary code matrix and can be selected from the set $$X_a = \left\{ \begin{bmatrix} e^{i\pi\lambda} & 0 \\ 0 & e^{i\pi\gamma} \end{bmatrix}, \begin{bmatrix} e^{i\pi\gamma} & 0 \\ 0 & e^{i\pi\lambda} \end{bmatrix}, \begin{bmatrix} e^{-i\pi\lambda} & 0 \\ 0 & e^{-i\pi\gamma} \end{bmatrix}, \begin{bmatrix} e^{-i\pi\gamma} & 0 \\ 0 & e^{-i\pi\lambda} \end{bmatrix} \right\}$$

such that the product of the second layer of information and the second unitary code matrix is defined by $U_a \epsilon X_a$. Accordingly, the transmitted signal, denoted as X, at a time t can be defined by $X(t)=X(t-1)U_b(t)U_a(t)$.

Another aspect of the present invention can include a method of processing multi-layered information received from a multi-antenna broadcasting system. The method can include receiving a wireless transmission having multi-layered information, wherein each layer of the information is encoded, decoding at least a first layer of information from the wireless transmission, and presenting the decoded information.

In one embodiment, the method can include decoding a second layer of information from the wireless transmission such that the decoded first layer of information and the decoded second layer of information are presented. The first layer of information can be decoded using a first unitary code matrix and the second layer of information can be decoded using a second and different unitary code matrix.

The step of decoding the first layer of information can include differentially decoding a product of the first layer of information and the first unitary code matrix. For example, $U_b$ can represent the unitary code matrix and can be selected from the set $$X_b = \left\{ \begin{bmatrix} 1 & 0 \\ 0 & 1 \end{bmatrix}, \begin{bmatrix} 0 & -1 \\ 1 & 0 \end{bmatrix}, \begin{bmatrix} 0 & 1 \\ -1 & 0 \end{bmatrix}, \begin{bmatrix} -1 & 0 \\ 0 & -1 \end{bmatrix} \right\}$$

such that the product of the first layer of information and the first unitary code matrix is defined by $U_b \epsilon X_b$.

The step of decoding the second layer of information can include differentially decoding a product of the second layer of information and the second unitary code matrix. For example, $U_a$ can represent the unitary code matrix and can be selected from the set $$X_a = \left\{ \begin{bmatrix} e^{i\pi\lambda} & 0 \\ 0 & e^{i\pi\gamma} \end{bmatrix}, \begin{bmatrix} e^{i\pi\gamma} & 0 \\ 0 & e^{i\pi\lambda} \end{bmatrix}, \begin{bmatrix} e^{-i\pi\lambda} & 0 \\ 0 & e^{-i\pi\gamma} \end{bmatrix}, \begin{bmatrix} e^{-i\pi\gamma} & 0 \\ 0 & e^{-i\pi\lambda} \end{bmatrix} \right\}$$

such that the product of the second layer of information and the second unitary code matrix is defined by $U_a \epsilon X_a$. As such, the wireless transmission, denoted as X, at a time t can be defined by $X(t)=X(t-1)U_b(t)U_a(t)$.

Other embodiments of the present invention can include a system having means for performing the various steps disclosed herein, as well as a machine readable storage for causing a machine to perform the various steps disclosed herein.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
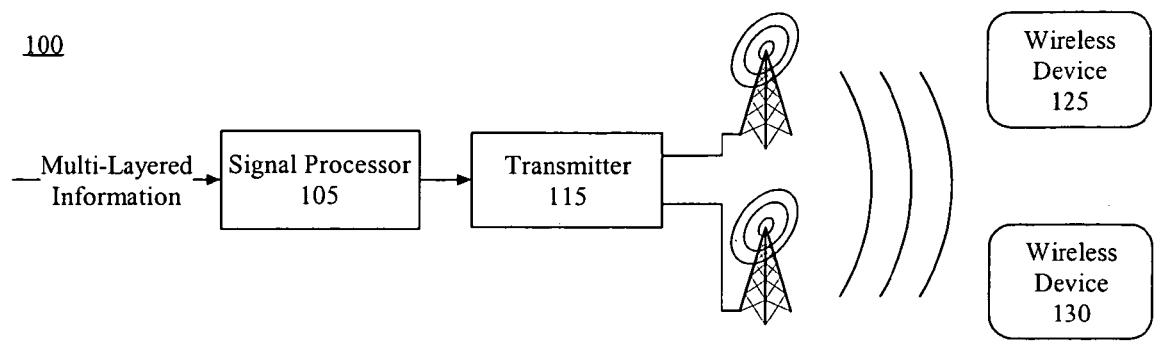
FIG. 1 is a schematic diagram illustrating a system for broadcasting multi-layered information in accordance with one embodiment of the present invention.

FIG. 1 is a schematic diagram illustrating a system 100 for broadcasting multi-layered information in accordance with one embodiment of the present invention. As shown, the system 100 is a multi-antenna broadcasting system. The system 100 can include a signal processor 105, a transmitter 110, and two or more transmitting antennas 115 and 120. Additionally, the system 100 can include one or more wireless devices 125 and 130.

The signal processor 105 can be configured to receive a signal or message composed of multi-layered information from a content or signal source. The signal processor 105 can use space-time coding to encode the received information. The multi-layered information that is to be encoded by the signal processor 105 can include at least two different layers of information. The first layer can include the most significant or important information, while the second layer can include more detailed, but less important information. The signal processor 105 can encode each different layer of information using a different encoding scheme.

The technique of sending a message using different layers is referred to as layered source coding. Examples of layered source coding can include, but are not limited to, the image coding standard JPEG-2000 and the video coding standard MPEG-4. These standards use what is sometimes referred to as "fine granularity scalability," which enables a gradual tradeoff between the error-free data throughput and the quality of the reconstructed image or video sequence.

Figure 2:
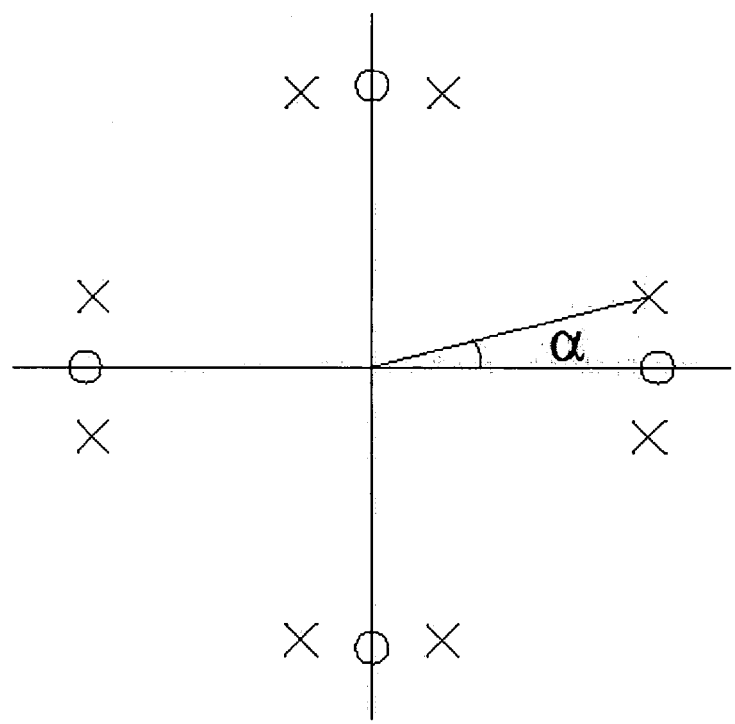
FIG. 2 is a flow chart illustrating a method of broadcasting multi-layered information using a multi-antenna broadcasting system in accordance with one embodiment of the present invention.

With layered source coding, more capable receivers, for example with higher signal-to-noise ratio (SNR), can achieve a higher data rate by decoding the messages contained in all layers while the less capable receivers can only decode the message in the bottom layer. Thus the "most important" information should be conveyed via the bottom layer while "less important" information can be transmitted via higher layer(s). An example of a modulation scheme designed for layered source coding is nonuniform phase-shift-keying modulation (PSK). Starting with a standard uniform PSK constellation, which contains data for the "basic" layer, a nonuniform PSK code constellation is obtained by adding a small additional phase shift a to each original constellation point, which contains the information for the "additional" layer. FIG. 2 illustrates an exemplary nonuniform 8-PSK constellation obtained from a standard "uniform" QPSK constellation by splitting each original constellation point "o" into a pair of new points "x".

Continuing with FIG. 1, a capable receiver with high SNR, such as wireless device 125, can distinguish among all eight constellation points which means that both the basic and the additional layer messages can be decoded, whereas to a less capable receiver, such as wireless device 130, the constellation may appear like a blurred QPSK constellation and hence it may only be able to distinguish between the different "large" phase shifts; thus only the basic message can be detected accurately. By such a construction, the error rates associated with the basic and the additional message are different. Consequently, the additional message can carry information that is of less importance for the reconstruction of the transmitted message than the basic message is. The error probability of the additional message can be adjusted by choosing different values of the additional phase shift α.

The signal processor 105 can be implemented as an computer program executing within a suitable information processing system. For example, the signal processor 105 can be implemented as a computer system or a standalone-programmable digital signal processing unit. In another embodiment, the signal processor 105 can be embodied as a hardware unit that is "hardwired" to perform the encoding functions described herein. In any case, the signal processor 105 can encode and detect signals differentially and is based upon phase-shift keying (PSK) modulation. As a result, the resulting transmitted signal can have substantially constant envelope.

Each transmitting antenna 115 and 120 is provided with both layers of encoded information. That is, the transmitter 110 can receive both the first and second encoded layers of information from the signal processor 105 and amplify the received signals so as to drive each transmitting antenna 115 and 120. Accordingly, both encoded layers of information are sent wirelessly through each of the transmitting antennas 115 and 120. The resulting transmitted signal includes several components which are of different importance for the reconstruction of the message being sent. Each component has an inherently different vulnerability to transmission errors.

As noted, more capable receivers, such as wireless device 125, can receive more than one layer of encoded information as well as decode the basic and additional layers. As such, wireless device 125 can decode the most significant information from the first layer as well as the less significant, but more detailed, information from the second layer. Less capable devices, such as wireless device 130, can receive the transmitted signal, but only decode the first, or the more basic layer(s) of information. Accordingly, wireless device 130 still can decode the most significant information from the first or basic layer(s) despite not being able to decode the more detailed information from the second or additional layer(s).

The wireless devices 125 and 130 each can include suitable receiving antennas, receivers or transceivers as the case may be, and decoders. As such, the wireless devices 125 and 130 can decode received multi-layered information using techniques matched to those described with respect to the encoding process. Once decoded, the wireless devices 125 and 130 can display information or play audio depending upon the content of the message that was decoded.

Figure 3:
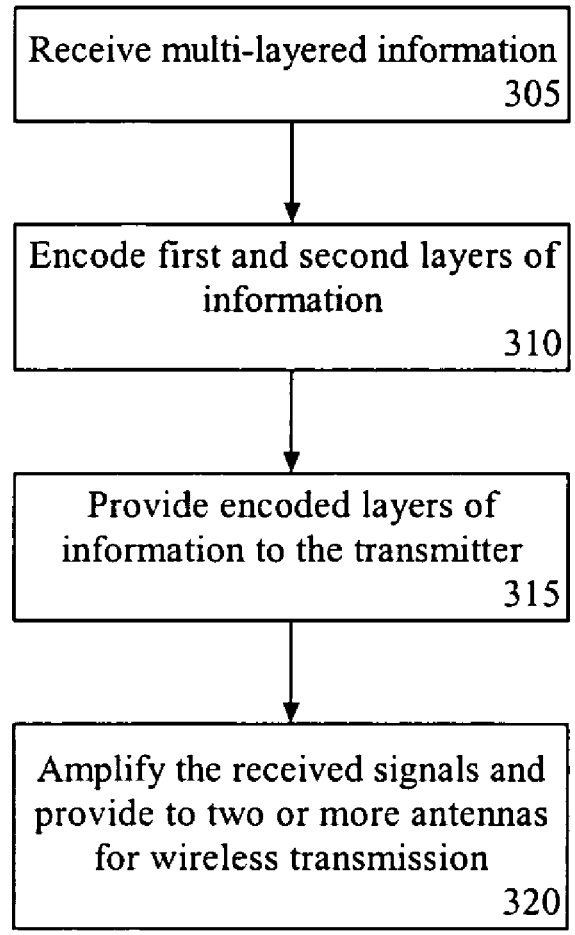

FIG. 3 is a flow chart illustrating a method 300 of broadcasting multi-layered information using a multi-antenna broadcasting system in accordance with one embodiment of the present invention. The method can begin in step 305 where multi-layered information is received by a signal processor. In step 310, the signal processor can encode the first and second layers of information. It should be appreciated, however, that the present invention is not limited to operation on layered source coding techniques that employ only two layers. Rather, the inventive arrangements disclosed herein can be applied to layered source coding techniques that utilize more than two layers.

The signal processor can encode each layer of information using a differential encoding scheme. In one embodiment, the signal processor can determine new non-uniform space-time codes based on differential encoding of the product of a first unitary code matrix $U_b \epsilon X_b$ associated with a basic message (the first layer), and a second unitary code matrix $U_a \epsilon X_a$ corresponding to another additional message (the second layer). Accordingly, the transmitted code matrix at time t can be specified as $X(t)=X(t-1)U_b(t)U_a(t)$.

In one embodiment of the present invention, $U_b$ can be selected from the following set:

$$X_b = \left\{ \begin{bmatrix} 1 & 0 \\ 0 & 1 \end{bmatrix}, \begin{bmatrix} 0 & -1 \\ 1 & 0 \end{bmatrix}, \begin{bmatrix} 0 & 1 \\ -1 & 0 \end{bmatrix}, \begin{bmatrix} -1 & 0 \\ 0 & -1 \end{bmatrix} \right\}$$

and $U_a$ can be selected from the following set:

$$X_a = \left\{ \begin{bmatrix} e^{i\pi\lambda} & 0 \\ 0 & e^{i\pi\gamma} \end{bmatrix}, \begin{bmatrix} e^{i\pi\gamma} & 0 \\ 0 & e^{i\pi\lambda} \end{bmatrix}, \begin{bmatrix} e^{-i\pi\lambda} & 0 \\ 0 & e^{-i\pi\gamma} \end{bmatrix}, \begin{bmatrix} e^{-i\pi\gamma} & 0 \\ 0 & e^{-i\pi\lambda} \end{bmatrix} \right\}$$

where $(\lambda, \gamma)$ are design parameters. The error performance (of both the basic and the additional message) depends on $\lambda$ and $\gamma$. Typically the error performance of the additional message can be traded against that of the basic message. In one embodiment, $\lambda$ can be greater than 0 and $\gamma$ can be set equal to 0. This selection of values, however, may not provide maximal diversity.

The union bound of the following two equations can be used to optimize over $(\lambda, \gamma)$ for a given tolerable loss. Equation 1:

Equation 1:

$$\leq \frac{1}{|X_b|} \sum_{\substack{(U_b^{(k)}, U_b^{(n)}) \in X_b \\ k \neq n}} \frac{1}{|X_a|^2}$$

$$\sum_{(U_a^{(r)}, U_a^{(s)}) \in X_2} \left| I - \frac{1}{2}(U_b^{(k)} U_a^{(r)} U_a^{(s)H} U_b^{(n)H} + U_b^{(n)} U_a^{(s)} U_a^{(r)H} U_b^{(k)H}) \right|^{-n_r} \cdot$$

$$\left( \frac{\rho^2}{4\sigma^2} \right)^{-n_r n_t}$$

and Equation 2:

$$\leq \frac{1}{|X_a|} \sum_{\substack{(U_a^{(r)}, U_a^{(s)}) \in X_2 \\ r \neq s}} \frac{1}{|X_b|^2}$$

$$\sum_{(U_b^{(k)}, U_b^{(n)}) \in x_b} \left| I - \frac{1}{2}(U_b^{(k)} U_a^{(r)} U_a^{(s)H} U_b^{(n)H} + U_b^{(n)} U_a^{(s)} U_a^{(r)H} U_b^{(k)H}) \right|^{-n_r} \cdot$$

$$\left( \frac{\rho^2}{4\sigma^2} \right)^{-n_r n_t}$$

In particular, for a given tolerable loss in performance of the basic message, the pair $(\lambda, \gamma)$ can be found that minimizes Equation 2.

Notably, all of the matrices in $U_a$ are unitary, with is a requirement for MIMO differential encoding. It also is symmetric and uniform which means that the error probability performance should be the same for constellation points. Also, similar to the nonuniform PSK encoding for a single channel, multiplication with the matrices in $U_a$ can be interpreted as adding a small phase shift to the elements of the basic message $U_b$.

Notably, the equation specified for $U_b$ includes the information in the first layer while the equation specified for $U_a$ includes the information in the second layer. Each matrix of $X_b$ has two rows and two columns where the rows represent two transmit antennas and the two columns represent two time intervals. It should be appreciated, however, that the present invention can be utilized in cases where there are more than two antennas and more than two layers of information. For example, if the two-layered space-time coding data model is defined by $Y=YU(t-1)U_b(t)U_a(t)+E$, then a three-layered data model, for example one with three antennas, can be represented as $Y=YU(t-1)U_b(t)U_a(t)U_c(t)+E$, where $U_c(t)$ is the third layer of information and $U(t-1)$, $U_b(t)$, $U_a(t)$, $U_c(t)$ are matrices of dimension 3×3.

In step 315, the encoded layers of information are provided to the transmitter. In step 320, the transmitter amplifies the received signal and provides the resulting signal to two or more antennas for transmission.

Other embodiments of the present invention can utilize the differential Alamouti code, which may provide improved performance in terms of bit-error rate. Such an embodiment, however, may not produce a constant signal envelope. That is, transmit power may not be constant for each antenna which can complicate hardware design. In another embodiment, a constant arbitrary phase shift can be added to each antenna without changing error performance or spectral efficiency. More particularly, rather than starting with $X(0)=I$, one can begin with a diagonal matrix of the type diag$\{e^{\alpha}, e^{i\beta}\}$, where alpha and beta are arbitrary.

The references disclosed herein are fully incorporated by reference.

The present invention can be realized in hardware, software, or a combination of hardware and software. Aspects of the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of broadcasting multi-layered information in a multi-antenna broadcasting system comprising:
   identifying at least a first and second layer of information to be transmitted;
   encoding the first layer of information for transmission, wherein encoding the first layer of information comprises differentially encoding a product of the first layer of information and a first unitary code matrix, $U_b$ representing the first unitary code matrix and being selected from the set $$X_b = \left\{ \begin{bmatrix} 1 & 0 \\ 0 & 1 \end{bmatrix}, \begin{bmatrix} 0 & -1 \\ 1 & 0 \end{bmatrix}, \begin{bmatrix} 0 & 1 \\ -1 & 0 \end{bmatrix}, \begin{bmatrix} -1 & 0 \\ 0 & -1 \end{bmatrix} \right\}$$

such that the product of the first layer of information and the first unitary code matrix is defined by $U_b \in X_b$;
   encoding the second layer of information for transmission, wherein the second layer of information is encoded using a second unitary code matrix different from the first unitary code matrix; and
   transmitting the first and second layers of the multi-layered information with the multi-antenna broadcasting system.

2. The method of claim 1, said step of encoding the second layer of information comprising differentially encoding a product of the second layer of information and the second unitary code matrix.

3. The method of claim 2, wherein $U_a$ represents the second unitary code matrix and is selected from the set $$X_a = \left\{ \begin{bmatrix} e^{i\pi\lambda} & 0 \\ 0 & e^{i\pi\gamma} \end{bmatrix}, \begin{bmatrix} e^{i\pi\gamma} & 0 \\ 0 & e^{i\pi\lambda} \end{bmatrix}, \begin{bmatrix} e^{-i\pi\lambda} & 0 \\ 0 & e^{-i\pi\gamma} \end{bmatrix}, \begin{bmatrix} e^{-i\pi\gamma} & 0 \\ 0 & e^{-i\pi\lambda} \end{bmatrix} \right\}$$

such that the product of the second layer of information and the second unitary code matrix is defined by $U_a \in X_a$.

4. The method of claim 3, wherein the transmitted signal X at a time t is defined by $X(t)=X(t-1)U_b(t)U_a(t)$.

5. A multi-antenna system for broadcasting multi-layered information comprising:
   means for identifying at least a first and second layer of information to be transmitted;
   means for encoding the first layer of information for transmission, said means for encoding the first layer of information comprising means for differentially encoding a product of the first layer of information and a first unitary code matrix, $U_b$ representing the first unitary code matrix and being selected from the set $$X_b = \left\{ \begin{bmatrix} 1 & 0 \\ 0 & 1 \end{bmatrix}, \begin{bmatrix} 0 & -1 \\ 1 & 0 \end{bmatrix}, \begin{bmatrix} 0 & 1 \\ -1 & 0 \end{bmatrix}, \begin{bmatrix} -1 & 0 \\ 0 & -1 \end{bmatrix} \right\}$$

such that the product of the first layer of information and the first unitary code matrix is defined by $U_b \in X_b$;
   means for encoding the second layer of information for transmission, wherein the means for encoding the second layer of information encodes the second layer of information using a second unitary code matrix different from the first unitary code matrix; and
   means for transmitting the first and second layers of the multi-layered information with the multi-antenna broadcasting system.

6. The system of claim 5, said means for encoding the second layer of information comprising means for differentially encoding a product of the second layer of information and the second unitary code matrix.

7. The system of claim 6, wherein $U_a$ represents the second unitary code matrix and is selected from the set $$X_a = \left\{ \begin{bmatrix} e^{i\pi\lambda} & 0 \\ 0 & e^{i\pi\gamma} \end{bmatrix}, \begin{bmatrix} e^{i\pi\gamma} & 0 \\ 0 & e^{i\pi\lambda} \end{bmatrix}, \begin{bmatrix} e^{-i\pi\lambda} & 0 \\ 0 & e^{-i\pi\gamma} \end{bmatrix}, \begin{bmatrix} e^{-i\pi\gamma} & 0 \\ 0 & e^{-i\pi\lambda} \end{bmatrix} \right\}$$

such that the product of the second layer of information and the second unitary code matrix is defined by $U_a \in \chi_a$.

8. The system of claim 7, wherein the transmitted signal X at a time t is defined by $X(t)=X(t-1)U_b(t)U_a(t)$.

9. A computer readable medium, having stored thereon a computer program having a plurality of code sections executable by a machine for causing the machine to perform the steps of:
  identifying at least a first and second layer of information to be transmitted;
  encoding the first layer of information for transmission using a first unitary code matrix; said step of encoding the first layer of information comprising differentially encoding a product of the first layer of information and a first unitary code matrix, $U_b$ representing the first unitary code matrix and being selected from the set $$X_b = \left\{ \begin{bmatrix} 1 & 0 \\ 0 & 1 \end{bmatrix}, \begin{bmatrix} 0 & -1 \\ 1 & 0 \end{bmatrix}, \begin{bmatrix} 0 & 1 \\ -1 & 0 \end{bmatrix}, \begin{bmatrix} -1 & 0 \\ 0 & -1 \end{bmatrix} \right\}$$

such that the product of the first layer of information and the first unitary code matrix is defined by $U_b \in \chi_b$;
  encoding the second layer of information for transmission using a second unitary code matrix; wherein the second layer of information is encoded using a second unitary code matrix different from the first unitary code matrix; and
  transmitting the first and second layers of the multi-layered information with the multi-antenna broadcasting system.

10. The computer readable medium of claim 9, said step of encoding the second layer of information comprising differentially encoding a product of the second layer of information and the second unitary code matrix.

11. The computer readable medium of claim 10, wherein $U_a$ represents the second unitary code matrix and is selected from the set $$X_a = \left\{ \begin{bmatrix} e^{i\pi\lambda} & 0 \\ 0 & e^{i\pi\gamma} \end{bmatrix}, \begin{bmatrix} e^{i\pi\gamma} & 0 \\ 0 & e^{i\pi\lambda} \end{bmatrix}, \begin{bmatrix} e^{-i\pi\lambda} & 0 \\ 0 & e^{-i\pi\gamma} \end{bmatrix}, \begin{bmatrix} e^{-i\pi\gamma} & 0 \\ 0 & e^{-i\pi\lambda} \end{bmatrix} \right\}$$

such that the product of the second layer of information and the second unitary code matrix is defined by $U_a \in \chi_a$.

12. The computer readable medium of claim 11, wherein the transmitted signal X at a time t is defined by $X(t)=X(t-1)U_b(t)U_a(t)$.

13. A method of processing multi-layered information received from a multi-antenna broadcasting system comprising:
  receiving a wireless transmission comprised of multi-layered information, wherein each layer of the information is encoded;
  decoding at least a first layer of information from the wireless transmission, wherein decoding the first layer of information comprises differentially decoding a product of the first layer of information and a first unitary code matrix, $U_b$ representing the first unitary code matrix and being selected from the set $$X_b = \left\{ \begin{bmatrix} 1 & 0 \\ 0 & 1 \end{bmatrix}, \begin{bmatrix} 0 & -1 \\ 1 & 0 \end{bmatrix}, \begin{bmatrix} 0 & 1 \\ -1 & 0 \end{bmatrix}, \begin{bmatrix} -1 & 0 \\ 0 & -1 \end{bmatrix} \right\}$$

such that the product of the first layer of information and the first unitary code matrix is defined by $U_b \in \chi_b$;
  decoding a second layer of information from the wireless transmission; wherein the second layer of information is decoded using a second unitary code matrix different from the first unitary code matrix; and
  presenting the decoded information.

14. The method of claim 13, said step of decoding the second layer of information comprising differentially decoding a product of the second layer of information and the second unitary code matrix.

15. The method of claim 14, wherein $U_a$ represents the unitary code matrix and is selected from the set $$X_a = \left\{ \begin{bmatrix} e^{i\pi\lambda} & 0 \\ 0 & e^{i\pi\gamma} \end{bmatrix}, \begin{bmatrix} e^{i\pi\gamma} & 0 \\ 0 & e^{i\pi\lambda} \end{bmatrix}, \begin{bmatrix} e^{-i\pi\lambda} & 0 \\ 0 & e^{-i\pi\gamma} \end{bmatrix}, \begin{bmatrix} e^{-i\pi\gamma} & 0 \\ 0 & e^{-i\pi\lambda} \end{bmatrix} \right\}$$

such that the product of the second layer of information and the second unitary code matrix is defined by $U_a \in \chi_a$.

16. The method of claim 15, wherein the wireless transmission X at a time t is defined by $X(t)=X(t-1)U_b(t)U_a(t)$.

17. A system for processing multi-layered information received from a multi-antenna broadcasting system comprising:
  means for receiving a wireless transmission comprised of multi-layered information, wherein each layer of the information is encoded;
  means for decoding at least a first layer of information from the wireless transmission, said means for decoding the first layer of information comprising means for differentially decoding a product of the first layer of information and a first unitary code matrix, $U_b$ representing the first unitary code matrix and being selected from the set $$X_b = \left\{ \begin{bmatrix} 1 & 0 \\ 0 & 1 \end{bmatrix}, \begin{bmatrix} 0 & -1 \\ 1 & 0 \end{bmatrix}, \begin{bmatrix} 0 & 1 \\ -1 & 0 \end{bmatrix}, \begin{bmatrix} -1 & 0 \\ 0 & -1 \end{bmatrix} \right\}$$

such that the product of the first layer of information and the first unitary code matrix is defined by $U_b \in \chi_b$;
  means for decoding a second layer of information from the wireless transmission, wherein the second layer of information is decoded using a second unitary code matrix different from the first unitary code matrix; and
  means for presenting the decoded information.

18. The system of claim 17, said means for decoding the second layer of information comprising means for differentially decoding a product of the second layer of information and the second unitary code matrix.

19. The system of claim 18, wherein $U_a$ represents the second unitary code matrix and is selected from the set $$X_a = \left\{ \begin{bmatrix} e^{i\pi\lambda} & 0 \\ 0 & e^{i\pi\gamma} \end{bmatrix}, \begin{bmatrix} e^{i\pi\gamma} & 0 \\ 0 & e^{i\pi\lambda} \end{bmatrix}, \begin{bmatrix} e^{-i\pi\lambda} & 0 \\ 0 & e^{-i\pi\gamma} \end{bmatrix}, \begin{bmatrix} e^{-i\pi\gamma} & 0 \\ 0 & e^{-i\pi\lambda} \end{bmatrix} \right\}$$

such that the product of the second layer of information and the second unitary code matrix is defined by $U_a \epsilon \chi_a$.

20. The system of claim 19, wherein the wireless transmission X at a time t is defined by $X(t)=X(t-1)U_b(t)U_a(t)$.

21. A computer readable medium, having stored thereon a computer program having a plurality of code sections executable by a machine for causing the machine to perform the steps of:
receiving a wireless transmission comprised of multi-layered information, wherein each layer of the information is encoded;
decoding at least a first layer of information from the wireless transmission, wherein the first layer of information is decoded using a first unitary code matrix decoding the first layer of information comprising differentially decoding a product of the first layer of information and a first unitary code matrix, $U_b$, representing the unitary code matrix and being selected from the set $$X_b = \left\{ \begin{bmatrix} 1 & 0 \\ 0 & 1 \end{bmatrix}, \begin{bmatrix} 0 & -1 \\ 1 & 0 \end{bmatrix}, \begin{bmatrix} 0 & 1 \\ -1 & 0 \end{bmatrix}, \begin{bmatrix} -1 & 0 \\ 0 & -1 \end{bmatrix} \right\}$$

such that the product of the first layer of information and the first unitary code matrix is defined $U_b \epsilon \chi_b$;
decoding a second layer of information from the wireless transmission, wherein the second layer of information is decoded using a second unitary code matrix different from the first unitary code matrix; and
presenting the decoded information.

22. The computer readable medium of claim 21, said step of decoding the second layer of information comprising differentially decoding a product of the second layer of information and the second unitary code matrix.

23. The computer readable medium of claim 22, wherein $U_a$ represents the second unitary code matrix and is selected from the set $$X_a = \left\{ \begin{bmatrix} e^{i\pi\lambda} & 0 \\ 0 & e^{i\pi\gamma} \end{bmatrix}, \begin{bmatrix} e^{i\pi\gamma} & 0 \\ 0 & e^{i\pi\lambda} \end{bmatrix}, \begin{bmatrix} e^{-i\pi\lambda} & 0 \\ 0 & e^{-i\pi\gamma} \end{bmatrix}, \begin{bmatrix} e^{-i\pi\gamma} & 0 \\ 0 & e^{-i\pi\lambda} \end{bmatrix} \right\}$$

such that the product of the second layer of information and the second unitary code matrix is defined by $U_a \epsilon \chi_a$.

24. The computer readable medium of claim 23, wherein the wireless transmission X at a time t is defined by $X(t)=X(t-1)U_b(t)U_a(t)$.

* * * * *